Patented Jan. 5, 1954

2,665,289

UNITED STATES PATENT OFFICE 2,665,289

CATALYTIC SYNTHESIS OF HYDROCARBONS

John H. Arnold, Summit, N. J., assignor to Hydrocarbon Research, Inc., New York, N. Y., a corporation of New Jersey No Drawing. Application September 25, 1948, Serial No. 51,298

2 Claims. (Cl. 260—449.6)

The present invention relates to the catalytic conversion of carbon monoxide and hydrogen into hydrocarbons, oxygenated hydrocarbons and mixtures thereof, and is more particularly concerned with maximizing the yield of desired products in operations limited to a feed gas which is relatively rich in carbon monoxide and correspondingly poor in hydrogen.

Yet more particularly, the invention contemplates the direct catalytic production of the desired products from feed gases containing hydrogen and carbon monoxide in a molar ratio of less than 1.0, preferably in the range of 0.4 to 0.9; that is to say, a synthesis gas typical of the gasification of coal, coke and other solid carbonaceous materials, as well as heavy liquid hydrocarbons, as for example, fuel oils and residual oils. As is known, the yield of desired product fractions, basis carbon monoxide supplied in the fresh feed gas, is usually relatively low where the feed gas available is thus deficient in hydrogen as compared with the synthesis gas compositions normally considered desirable.

In accordance with the present invention, however, it has been discovered that, within the foregoing critical range of fresh feed composition, the proportion of fresh feed carbon monoxide converted into the desired hydrocarbon products may be materially increased by continuously recycling to the inlet of the reaction zone a substantial stream of the normally gaseous effluent, after separating the normally liquid product fractions, and simultaneously supplementing the total feed stream (i. e., fresh feed plus recycle) with a substantial but limited proportion of water vapor so that the water vapor content of the total feed stream is generally less than about 30 mol per cent, on the basis of the hydrogen and carbon monoxide of the fresh feed stream. It has furthermore been discovered that removal of by-product carbon dioxide from the recycle stream being returned to the reaction zone permits realization of a substantial additional improvement in yield.

Accordingly, the present invention involves the continuous introduction of fresh feed synthesis gas containing hydrogen and carbon monoxide in a molar ratio of less than 1.0 into a reaction zone containing synthesis catalyst under reaction conditions, including an elevated reaction temperature and superatmospheric pressure, to effect substantial conversion into the desired hydrocarbon and/or oxygenated hydrocarbon products. The effluent products of reaction are continuously withdrawn and treated for the separation of the desired products of reaction, including the oily and water-soluble constituents and gaseous products. Part of the resulting normally gaseous residue is continuously recycled into admixture with the fresh feed and repassed through the reaction zone.

Simultaneously, a stream of water vapor is incorporated in the total feed in a regulated proportion below about 30 mol per cent and preferably below about 20 mol per cent, on the basis of the hydrogen and carbon monoxide of the fresh feed, advantageously being correlated with relative proportions of hydrogen and carbon monoxide in the fresh feed stream such that maximum improvement in yield is noted.

Preferably, the recycle stream is treated for the removal of contained product carbon dioxide to as great an extent as practicable so that the recycle stream reaching the reaction zone is of substantially decreased carbon dioxide content as contrasted with that proportion which would otherwise be present.

In general, the completeness with which the carbon dioxide removal is effected is reflected in the magnitude of the improvement in yield.

It has hitherto been proposed to incorporate various diluents, including water vapor, in the reactor feed for the purpose of preventing localized overactivity and, accordingly, localized overheating of the catalyst. Such expedients, insofar as is known, have always caused a substantial decrease in yield as compared with operation under properly controlled temperature conditions, without a diluent. The present invention is particularly advantageous in that it involves the correlated regulation of water vapor addition simultaneously with modification of the recycle stream such that a materially increased production of desired products is realized on the basis of the feed carbon supplied.

The present invention has particular application to hydrocarbon syntheses employing iron catalysts at reaction temperatures in the range from about 550–700° F., usually under superatmospheric pressures in the range from about 150 to 500 p. s. i. The precise temperature and pressure used depend upon such factors as the product fractions desired and the individual character of the catalyst.

The catalyst may comprise suitably reduced and conditioned particles of iron, containing the usual promoters and activators, such for example, as the oxides of the alkali metal or alkaline earth metals, titania, thoria, alumina and many others, usually in minor proportion, say, below 5.0 per cent by weight. The invention contemplates, alternatively, the use of supported catalyst wherein the catalytically active components are associated with carriers, such as silica gel, fuller's earth, diatomaceous earth and the like.

Desirably, contact may be effected with the catalyst maintained in a fluidized condition by the upflow of reactants or otherwise, and disposed in heat exchange relation with suitable cooling surfaces effective to maintain uniform reaction temperature throughout.

As intimated above, it is contemplated that the rate of recycle of the normally gaseous residue be substantial; that is to say, the volume of recycle should be at least equal to approximately one-half the volume of the fresh feed synthesis gas, and preferably at least equal to the fresh feed volume, as for example, about 2 volumes of recycle for each volume of fresh feed.

Under such conditions, the process reaches a condition of settled operation with a substantially constant addition to the total feed of water vapor at a rate such that improved yield is realized. Removal of carbon dioxide from the recycle stream may be continuously effected by means of a suitable gas plant, preferably, for example, an absorption system such as the Girbotol process, wherein carbon dioxide is absorbed by a stream of ethanolamine or the like. Desirably, the carbon dioxide separation is effected by a system which does not otherwise materially alter the composition of the recycle stream.

It is important to note that the water vapor addition effective for maximizing hydrocarbon yield may vary, depending upon the extent of carbon dioxide removal and the relative proportion of hydrogen and carbon monoxide in the fresh feed gas. For example, as intimated earlier, the addition of water is generally below about 30 mol per cent and preferably, below 20 mol per cent on the basis of the hydrogen and carbon monoxide in the fresh feed, and frequently in the vicinity of 15 per cent. With carbon dioxide removal from the recycle stream, the water addition for optimum yield decreases somewhat and with substantial absence of carbon dioxide in the feed to the reactor, the effective proportion of water vapor decreases substantially as the molar ratio of hydrogen to carbon monoxide in the fresh feed synthesis gas approaches the value of 1:1.

More specifically, as the molar $H_2:CO$ ratio in the fresh feed gas is increased within the critical range below 1.0, the water vapor addition required for maximum yield becomes progressively lower, in general approaching, on the foregoing basis of addition, a minimum value of about one mol per cent, on the basis of the carbon monoxide and the hydrogen in the fresh feed gas.

For example, when the total feed gases are maintained substantially free of carbon dioxide, that is to say, when the carbon dioxide removal is carried out to a practical operating minimum below about 1 to 2 per cent, the optimum water vapor, in mol per cent, based on the fresh feed hydrogen and carbon monoxide, approximates a value equal to one-half the difference between the mol percentages of carbon monoxide and hydrogen in the fresh feed synthesis gas. Thus, a fresh feed synthesis gas containing about sixty mol per cent carbon monoxide and about forty mol per cent hydrogen would, in a process as above, evidence maximum yield of desired products with a water vapor content equal to about 10 per cent of the total fresh feed synthesis gas. The foregoing use of the term "approximates" contemplates the calculated water vapor per cent value ±3%. Thus, with the calculated value of 10%, the indicated desirable range of water vapor content is from 7% to 13%.

As an example, a synthesis gas is passed upwardly through a fluidized mass of iron catalyst comprising finely divided particles of about 200 mesh or finer, prepared by reducing finely divided mill scale containing about 1.5 per cent of potassium oxide ($K_2O$) and about 1.0 per cent alumina ($Al_2O_3$), and thereafter conditioning by passage of the synthesis gas under reaction conditions until a state of settled operation has been reached.

The fresh feed comprises a synthesis gas typical of that obtained from the gasification of coal in the presence of substantially pure oxygen and water vapor and having a composition substantially as folows:

| | Per cent |
|---|---|
| $H_2$ | 31.3 |
| $CO$ | 62.5 |
| $CO_2$ | 2.0 |
| $H_2O$ | 2.4 |
| $N_2$ | 1.8 |

The fresh synthesis gas is passed upwardly through the fluid phase of catalyst at a pressure of 250 p. s. i. and a temperature of 650° F. The effluent gasiform products of reaction are continuously withdrawn, condensed, and separated at a temperature of 70° F., and the residual, normally gaseous fraction is recycled to the inlet of the reactor at a fresh feed recycle ratio of about 2:1, standard volume basis.

Space velocity is maintained at an approximate value of 50, basis standard cubic feet per hour of fresh feed gas per pound of catalyst.

The following table compares in six parallel runs the variation in the yield of desired hydrocarbon products in accordance with the proportion of water vapor incorporated in the feed to the reactor, and the extent of carbon dioxide removal from the recycle stream.

Table

| | A | B | C | D | E | F |
|---|---|---|---|---|---|---|
| Mol Percent Water Vapor basis $H_2$ and CO in Fresh Feed | 2.66 | 7.89 | 17.27 | 30.0 | 18.22 | 0.0 |
| $CO_2$ Separation from Recycle Stream | No | No | No | No | (¹) | No |
| Percent Fresh Feed CO converted to Hydrocarbons or Oxygenated Hydrocarbons | 44.5 | 45.4 | 47.1 | 46.4 | 47.5 | 44.2 |

¹ Substantially complete removal.

Runs A, B and C show increasing yield with an increase in the proportion of added water vapor, up to about 16–17 per cent. Run D indicates the benefit of water addition is not as great as it was at 16–17 per cent. A comparison of run E with run C illustrates the additional improvement in yield resulting from extracting carbon dioxide from the recycle stream.

In run F, both the fresh feed and recycle stream are dried to substantially completely effect water vapor removal, that is, to a level not exceeding the vapor pressure of water at a temperature of about 100° F. and at the operating pressure.

In general, the magnitude of improvement in yield experienced, as expressed on the basis of fresh feed carbon monoxide converted to hydrocarbons and oxygenated hydrocarbons, increases somewhat as the $H_2:CO$ ratio of the fresh feed gas increases to a point approximately midway of the critical range. At the upper limit of below a molar ratio of 1.0, the benefits correspond in a general way to those given above.

Obviously, many modifications and variations of the invention as above set forth may be made without departing from the spirit and scope thereof, and only such limitations should be imposed as are indicated in the appended claims.

I claim:

1. In the synthesis of hydrocarbons, oxygenated hydrocarbons and mixtures thereof wherein a synthesis gas comprising a mixture of hydrogen and carbon monoxide is passed in contact with an iron-containing hydrocarbon synthesis catalyst under an elevated temperature of 550–700° F. and superatmospheric pressure at which the reactants are substantially converted into said desired products of reaction, the steps of improving the utilization of relatively hydrogen-poor, fresh feed synthesis gas containing said hydrogen and carbon monoxide in the relative molar proportions in the range between 0.4:1 and 0.9:1, which comprise continuously contacting said catalyst with a volume of said fresh feed synthesis gas in admixture with a greater volume of a recycle gas hereinbelow specified and in further admixture with a molar quantity of water vapor approximating one-half the difference between the molar percent of carbon monoxide and the molar percent of hydrogen in said fresh feed synthesis gas, withdrawing from contact with said catalyst a gaseous effluent of the products of reaction, and separating normally liquid products of reaction and carbon dioxide from said gaseous effluent to leave a gaseous residue which is utilized in part as said recycle gas.

2. The process according to claim 1 wherein the volume of recycle gas is at least twice that of the fresh feed synthesis gas.

JOHN H. ARNOLD.

References Cited in the file of this patent

UNITED STATES PATENTS

| Number | Name | Date |
|---|---|---|
| 2,213,415 | Slatineanu | Sept. 3, 1940 |
| 2,248,099 | Linckh et al. | July 8, 1941 |
| 2,279,052 | Michael et al. | Apr. 7, 1942 |
| 2,309,034 | Barr | Jan. 19, 1943 |
| 2,417,164 | Huber, Jr. | Mar. 11, 1947 |
| 2,436,568 | Griffin et al. | Feb. 24, 1948 |
| 2,475,214 | Barr | July 5, 1949 |
| 2,497,964 | Sumerford | Feb. 21, 1950 |
| 2,498,838 | Griffin | Feb. 28, 1950 |
| 2,560,344 | Hemminger | July 10, 1951 |